United States Patent
Giametta

(10) Patent No.: US 9,121,299 B2
(45) Date of Patent: Sep. 1, 2015

(54) AXIALLY RETRACTABLE BRUSH SEAL SYSTEM

(71) Applicant: General Electric Company, Schenectady, NY (US)

(72) Inventor: Andrew Paul Giametta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 13/910,168

(22) Filed: Jun. 5, 2013

(65) Prior Publication Data

US 2014/0361489 A1    Dec. 11, 2014

(51) Int. Cl.
*F16J 15/44*   (2006.01)
*F01D 11/08*   (2006.01)
*F01D 11/12*   (2006.01)

(52) U.S. Cl.
CPC .............. *F01D 11/08* (2013.01); *F01D 11/12* (2013.01); *F01D 11/122* (2013.01); *F01D 11/125* (2013.01); *F01D 11/127* (2013.01)

(58) Field of Classification Search
CPC ........................... F16J 15/3284; F16J 15/3288
USPC ......................................................... 277/355
See application file for complete search history.

(56) References Cited

U.S. PATENT DOCUMENTS

| | | | | |
|---|---|---|---|---|
| 6,098,990 A * | 8/2000 | Marnot | | 277/551 |
| 6,786,487 B2 * | 9/2004 | Dinc et al. | | 277/355 |
| 7,249,769 B2 * | 7/2007 | Webster | | 277/411 |
| 7,458,584 B2 * | 12/2008 | Addis | | 277/355 |
| 7,744,092 B2 * | 6/2010 | Mortzheim | | 277/303 |
| 8,490,980 B2 * | 7/2013 | Wright et al. | | 277/355 |
| 2003/0102630 A1 * | 6/2003 | Dinc et al. | | 277/355 |
| 2008/0169616 A1 | 7/2008 | Awtar et al. | | |
| 2008/0265514 A1 * | 10/2008 | Mortzheim | | 277/303 |
| 2010/0221099 A1 | 9/2010 | Giametta | | |
| 2012/0177483 A1 | 7/2012 | Ali et al. | | |
| 2012/0210722 A1 | 8/2012 | Hynum et al. | | |
| 2012/0286476 A1 | 11/2012 | Samudrala et al. | | |
| 2013/0064645 A1 | 3/2013 | Giametta | | |

OTHER PUBLICATIONS

U.S. Appl. No. 13/736,511, filed Jan. 8, 2013, Giametta.

* cited by examiner

*Primary Examiner* — Gilbert Lee
(74) *Attorney, Agent, or Firm* — Sutherland Asbill & Brennan LLP

(57) ABSTRACT

The present application provides an axially retractable seal system positioned within a seal slot of a stationary component and adjacent to a rotating component. The axially retractable seal system may include a seal with an upper flange positioned within the seal slot and one more bristles extending towards the rotating component and a spring positioned axially between the upper flange of seal and the seal slot such that the seal is forced into a retracted position.

18 Claims, 3 Drawing Sheets

AXIALLY RETRACTABLE BRUSH SEAL SYSTEM

TECHNICAL FIELD

The present application and the resultant patent relate generally to gas turbine engines and more particularly relate to an axially retractable brush seal system to reduce seal clearances and clearance variations for improved performance and lifetime.

BACKGROUND OF THE INVENTION

Brush seals are commonly used to eliminate or reduce air leakage through a gap between adjacent parts or components. For example, brush seals may be positioned about rotating components within turbine engines used for power generation and the like. Typically, the brush seals reduce the leakage between regions at different air pressures. As a specific example, a brush seal may be used to reduce air leakage through the gap (or the clearance) between a stationary component such as a stator and a rotating component such as a rotor. A brush seal may be a contact seal with a number of bristles in contact with the rotor surface. The bristles allow for a tight clearance with reduced leakage as compared to most non-contact seals such as labyrinth seals and the like.

Brush seals, however, may undergo substantial wear due to the interference between the bristles and the rotor caused by transient events during, for example, turbine startup or shutdown. During these transient events, the rotary machine may experience considerable temperature gradients, differential growth, vibrations, and other types of dynamic behavior. This wear may accumulate over a number of startup/shutdown cycles so as to reduce the leakage performance of the seal during steady state operations. Wear on the bristles generally correlates with an overall decrease in turbine efficiency and power output.

One response to such transient events has been the use of radially retractable brush seals such as variable clearance positive pressure packing ("VCPPP") seal technology and the like. Generally described, VCPPP seal technology radially retracts the brush seals during startup so as to limit wear. Such radial movement, however, generally requires large segment gaps to accommodate the radius change. These segment gaps can drive additional leakage. The brush seal ring also may have the risk of failing to close properly if contaminants and the like accumulate therein. For example, bristles at the segment ends may fall into the gap when the brush seal ring opens up.

There is thus a desire for an improved retractable seal system that eliminates or reduces the impact of transient events and the like. Such an improved system should provide overall seal system predictability, reliability, and an increased life time with reasonable costs.

SUMMARY OF THE INVENTION

The present application and the resultant patent thus provide an axially retractable seal system positioned within a seal slot of a stationary component and adjacent to a rotating component. The axially retractable seal system may include a seal with an upper flange positioned within the seal slot and one more bristles extending towards the rotating component and a spring positioned axially between the upper flange of seal and the seal slot such that the seal is forced into a retracted position with respect to the rotating component.

The present application and the resultant patent further provide a method of operating a seal system between a stationary component and a rotating component. The method may include the steps of positioning a brush seal in a seal slot of the stationary component, axially positioning a spring between the brush seal and the seal slot such that the spring forces the brush seal into a retracted position with respect to the rotating component, and developing a pressure differential across the brush seal such that the pressure differential forces the brush seal into an engaged position with respect to the rotating component.

The present application and the resultant patent further provide an axially retractable seal system positioned within a seal slot of a stationary component and adjacent to a rotating component. The axially retractable seal system may include a brush seal with an upper flange positioned within the seal slot and one more bristles extending towards the rotating component and a spring positioned axially between the upper flange of brush seal and the seal slot such that the brush seal is maneuverable between a retracted position and an engaged position.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
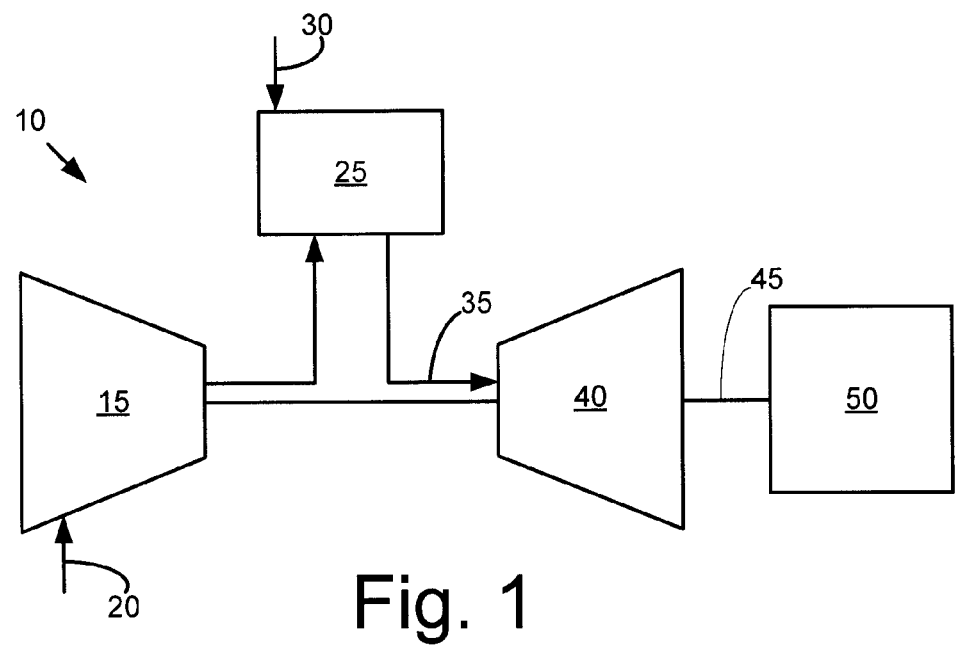
FIG. 1 is a schematic diagram of a gas turbine engine showing a compressor, combustor, and a turbine.

Referring now to the drawings, in which like numerals refer to like elements throughout the several views, FIG. 1 shows a schematic view of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, various types of liquid fuels, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
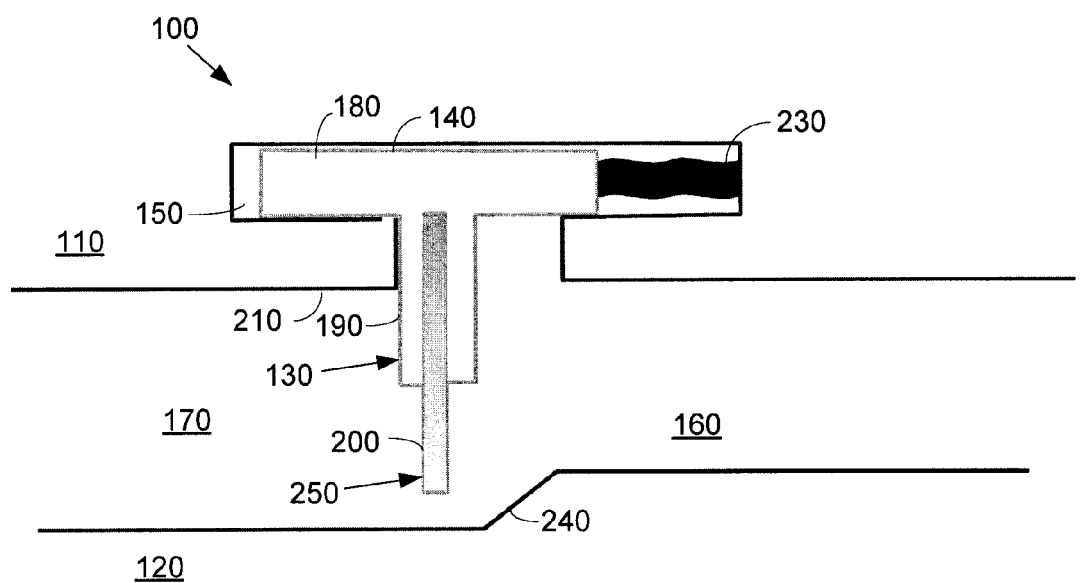
FIG. 2 is a schematic diagram of an axially retractable brush seal system as may be described herein in a retracted position.
Figure 3:
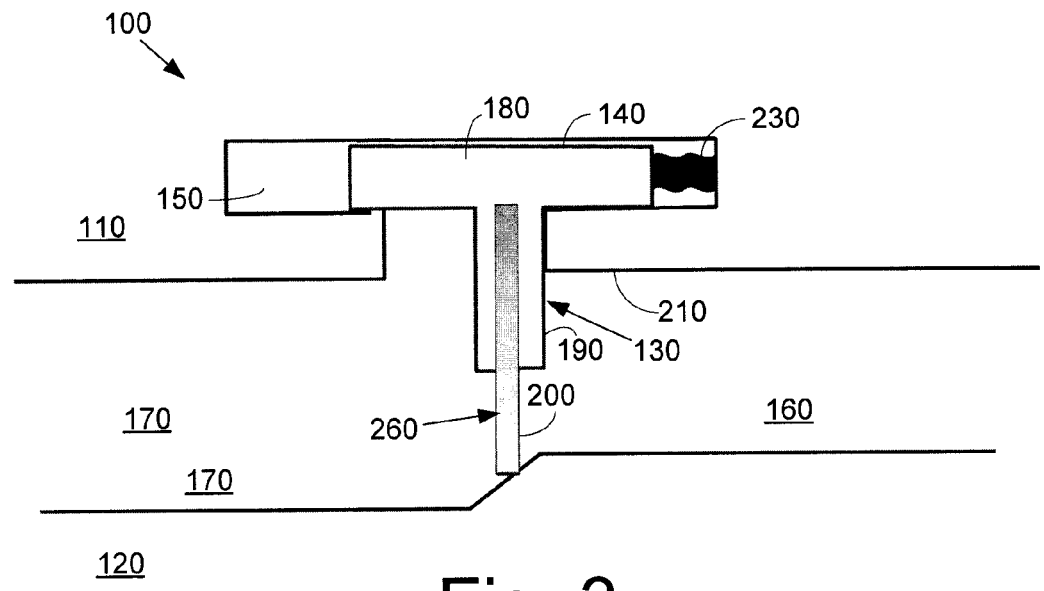
FIG. 3 is a schematic diagram of the axially retractable brush seal system of FIG. 2 in an engaged position.

FIGS. 2 and 3 show an example of a passive axially retractable brush seal system 100 as may be described herein. The passive axially retractable brush seal system 100 may be positioned between a stationary component 110 such as a stator and the like and a rotating component 120 such as a rotor and the like. Any type of stationary components 110 and rotating components 120 may be used herein. Multiple axially retractable brush seal systems 100 may be used herein.

The passive axially retractable brush seal system 100 may include a brush seal 130. The brush seal 130 may be mounted rigidly in a retractable seal holder 140. Alternatively, the brush seal 130 may be shaped into the retractable seal holder 140 itself. The brush seal 130 may be positioned within a seal slot 150 of the stationary component 110 and extend towards the rotating component 120. The brush seal 130 may be positioned between a high pressure side 160 and a low pressure side 170. The seal holder 140 may include an upper flange 180 positioned within the seal slot 150 and an elongated neck 190 extending towards the rotating component 120. Additional flanges (or wings) also may be used to aid in preloading and the like. One or more bristles 200 may be mounted about the elongated neck 190 and extend towards the rotating component 120. The bristles 200 may be made out of metal or other materials such as ceramics. Any number of the bristles 200 may be used. Other types of seals and sealing components may be used herein.

The flange 180 of the seal holder 140 may be positioned on a pair of hooks 210 formed in the seal slot 150 of the stationary component 110. One or more springs 230 may be positioned about the upper flange 180 and the groove of the seal slot 150. The spring 230 may be a leaf spring, helical spring, a disk spring, and the like. The spring 230 may extend in a largely axial direction within the seal slot 150. The spring 230 may be biased in a given direction as will be described in more detail below. The nature of the bias or the moving force required to move the spring 230 may vary. The spring 230 may have any size, shape, or configuration. Other components and other configurations may be used herein.

The stationary component 110 may include a transition area in the form of a tapered seating surface 240 and the like. The tapered seating surface 240 may be an area of a change in the diameter or other shape of the rotating component. Any type of shape change may be used herein. The passive axially retractable brush seal system 100 may be positioned about the tapered seating surface 240. FIG. 2 shows the brush seal 130 in a retracted position 250 away from the tapered seating surface 240 and with the bristles 200 removed from contact. FIG. 3 shows the brush seal 130 in an engaged position 260 with the bristles 200 in contact with or closely positioned adjacent to the tapered seating surface 240.

During transient events such as startup and shutdown, the brush seal 130 may remain in the retracted position 250 because of the bias towards that position by the spring 230. As the turbine 10 approaches steady state conditions, however, a pressure differential may develop between the high pressure side 160 and the low pressure side 170. This pressure differential may be sufficient to overcome the bias of the spring 230 and may force the brush seal 130 into the engaged position 260 as shown in FIG. 3. The retracted position 250 thus limits the contact of the brush seal 130 with the rotating component 120 while the engaged position 260 limits the leakage flow across the brush seal 130 for improved performance.

Figure 4:
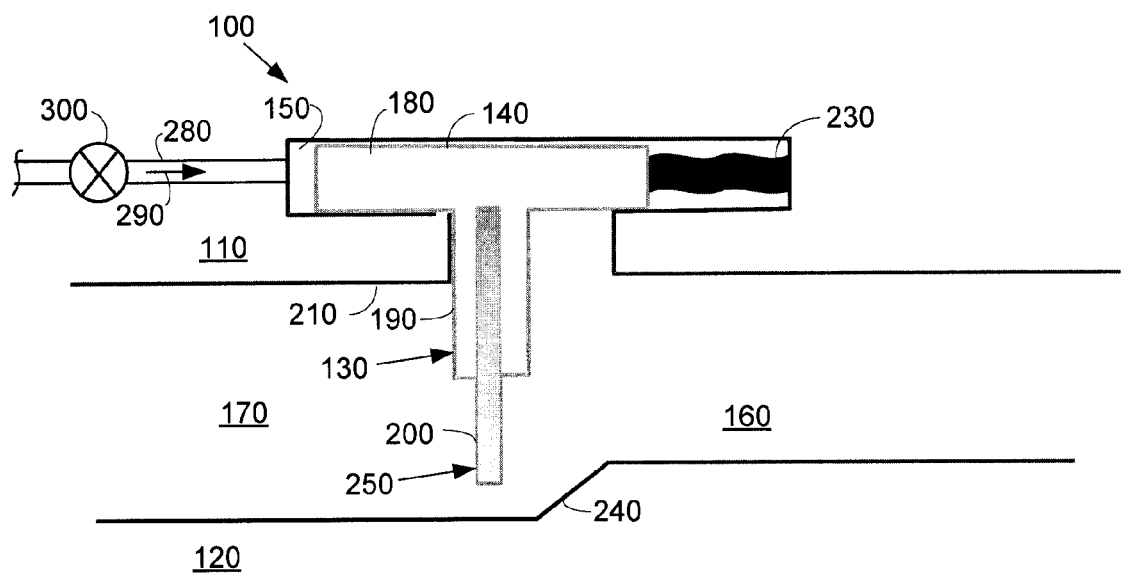
FIG. 4 is a schematic diagram of an alternative embodiment of an axially retractable brush seal system as may be described herein in a retracted position.
Figure 5:
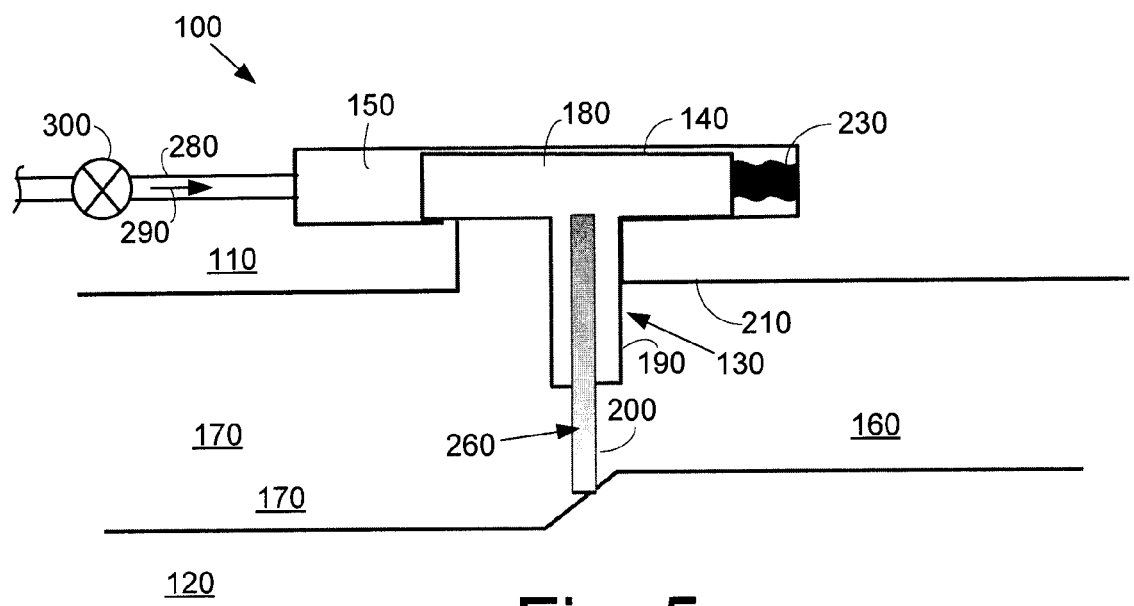
FIG. 5 is a schematic diagram of the axially retractable brush seal system of FIG. 4 in an engaged position.

FIGS. 4 and 5 show an active axially retractable brush seal system 270 as may be described herein. The active axially retractable brush seal system 270 largely may include the components of the passive axially retractable brush seal system 100 described above but with the addition of a pressurization line 280. The pressurization line 280 may be in communication with the seal slot 150. The pressurization line 280 may provide a flow of air 290 or other fluid at a variable pressure. One or more valves 300 or other types of flow control devices may be positioned about the pressurization line 280. Multiple axially retractable brush seal systems 270 may be used herein. Other components and other configurations may be used herein.

The active axially retractable brush seal system 270 thus may use the variable pressure flow of air 290 to actively maneuver the brush seal 130 between the retracted position 250, the engaged position 260, and perhaps a number of intermediate positions depending upon overall turbine operation, efficiency, and other parameters. The valves 300 or other types of flow control devices on the pressurization line 280 may be activated by the overall gas turbine controls or otherwise. Specifically, the flow of air 290 may be varied so as to overcome the bias of the spring 230. The active axially retractable brush seal system 270 may be used with or without the pressure differential developed about steady state conditions.

The brush seal 130 thus may be axially shifted in a passive or an active manner between the retracted position 250 and the engaged position 260 about the tapered seating surface 240 of the rotating component 120. Intermediate positions also may be used herein. Specifically, the brush seal 130 may be shifted in the axial direction at steady state such that the brush seal 130 provides a low effective clearance. The brush seal 130 then may be retracted during transient events so as to avoid transient rubs. The axially retractable brush seal systems 100, 270 thus reduce seal clearances and clearance variations. The axially retractable brush seal systems 100, 270 may be well suited for use as high pressure packing seals, inducer dynamic seals, and the like where leakage is measured by clearance.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. An axially retractable seal system positioned within a seal slot of a stationary component and adjacent to a rotating component, the axially retractable seal system comprising:
   a seal;
   the seal comprising an upper flange positioned within the seal slot and one or more bristles extending towards the rotating component; and
   a spring positioned axially between the upper flange of the seal and the seal slot such that the seal is forced into a retracted position, wherein:
   the one or more bristles are separated from the rotating component in the retracted position;
   the one or more bristles are in contact with the rotating component in an engaged position; and
   the seal moves linearly along the axis.

2. The axially retractable seal system of claim 1, wherein the seal comprises a brush seal.

3. The axially retractable seal system of claim 1, further comprising a passive axially retractable seal system.

4. The axially retractable seal system of claim 1, wherein the seal comprises an elongated neck extending towards the rotating component.

5. The axially retractable seal system of claim 1, wherein the spring comprises a leaf spring, a helical spring, or a disk spring.

6. The axially retractable seal system of claim 1, wherein the one or more bristles comprise a metal or a ceramic.

7. The axially retractable seal system of claim 1, wherein the spring comprises a bias towards the retracted position.

8. The axially retractable seal system of claim 1, further comprising an active axially retractable seal system.

9. The axially retractable seal system of claim 1, further comprising a pressurization line in communication with the seal slot.

10. The axially retractable seal system of claim 9, wherein the pressurization line provides a variable pressure flow of air to the seal slot.

11. The axially retractable seal system of claim 9, wherein the pressurization line comprises one or more valves thereon.

12. A method of operating a seal system between a stationary component and a rotating component, comprising:
positioning a brush seal in a seal slot of the stationary component;
axially positioning a spring between the brush seal and the seal slot;
the spring forcing the brush seal into a retracted position with respect to the rotating component, wherein one or more bristles of the brush seal are separated from the rotating component in the retracted position, and the brush seal moves linearly along the axis;
developing a pressure differential across the brush seal; and
the pressure differential forcing the brush seal into an engaged position with respect to the rotating component.

13. The method of claim 12, wherein the step of forcing the brush seal into an engaged position comprises forcing the brush seal into contact with the rotating component.

14. The method of claim 12, wherein the step of forcing the brush seal into an engaged position comprises axially maneuvering the brush seal.

15. An axially retractable seal system positioned within a seal slot of a stationary component and adjacent to a rotating component, the axially retractable seal system comprising:
a brush seal;
the brush seal comprising an upper flange positioned within the seal slot and one more bristles extending towards the rotating component; and
a spring positioned axially between the upper flange of brush seal and the seal slot such that the brush seal is maneuverable between a retracted position and an engaged position, wherein the one or more bristles are separated from the rotating component in the retracted position, and the seal moves linearly along the axis.

16. The axially retractable seal system of claim 15, wherein the one or more bristles are in contact with the rotating component in the engaged position.

17. The axially retractable seal system of claim 15, wherein the spring comprises a leaf spring, a helical spring, or a disk spring and wherein the spring is biased towards the retracted position.

18. The axially retractable seal system of claim 15, further comprising a pressurization line in communication with the seal slot.

* * * * *